United States Patent [19]
Floyd

[11] Patent Number: 5,799,515
[45] Date of Patent: Sep. 1, 1998

[54] AUTO COLUMN PIVOT LOCK

[76] Inventor: Herbert R. Floyd, 420 E. 105th St., Apt. 3E, East River Houses, c/o Bell One, New York, N.Y. 10029

[21] Appl. No.: 749,784

[22] Filed: Nov. 15, 1996

Related U.S. Application Data

[63] Continuation-in-part of Ser. No. 390,484, Feb. 17, 1995, abandoned.

[51] Int. Cl.$^6$ .................................................. B60R 25/06
[52] U.S. Cl. ............................ 70/18; 70/237; 70/247; 70/417
[58] Field of Search .................... 70/245–248, 18, 70/417, 237, 423–428, 455; 180/287

[56] References Cited

U.S. PATENT DOCUMENTS

| | | | |
|---|---|---|---|
| 1,492,645 | 5/1924 | Lillard | 70/211 |
| 3,916,658 | 11/1975 | Barry | 70/417 |
| 4,008,589 | 2/1977 | Harrell | 70/237 X |
| 4,074,550 | 2/1978 | Rowlings | 70/237 |
| 4,167,222 | 9/1979 | El Bindari | 70/417 X |
| 4,658,613 | 4/1987 | Solow | 70/247 X |
| 4,719,986 | 1/1988 | Richardson, Jr. | 70/237 X |
| 4,781,268 | 11/1988 | Richardson, Jr. | 180/287 |
| 4,790,406 | 12/1988 | Ferrell et al. | 180/287 |
| 5,036,683 | 8/1991 | Geuvjehizian | 70/417 X |
| 5,461,891 | 10/1995 | Noel | 70/237 X |
| 5,566,560 | 10/1996 | LiCausi | 70/417 X |

Primary Examiner—Lloyd A. Gall

[57] ABSTRACT

A pivotal column auto lock to prevent unauthorized access to a steering column having a housing, and a cylinder lock for controlling a movable axis pin. The axis pin being formed so as to be flexibly inserted into an enclosure being secured, releasably upon a pivotal column enclosure to block the rotation of the pivotal column when a vehicle is parked. The housing having two equal walls that fits over a steering column-mounted ignition lock, thus a lock-housing having two figurations beneath that fits a pair of grooves upon the two equal walls. This arrangement secures these two equal walls above, while a releasably unmovable rod secures them bellow. The pivotal column enclosure includes two equal walls having a cutout through one wall thus of which a mounted gear-shift lever extends. A flat is provided upon the other equal wall for easy removal of the cylinder lock, when it is rotated to a neutral position. This position is provided again for the securement of the pivotal column enclosure beneath by way of a latching device, and for the insertion of the enclosure in which receives the inserted axis pin. The cylinder lock has a latch beneath being inserted into a pocket formed upon the housing. This arrangement will prevent unauthorized persons from pivoting the pivotal column out of the "park" position, while the steering column continues to swivel conventionally without change.

12 Claims, 12 Drawing Sheets

AUTO COLUMN PIVOT LOCK

CROSS-REFERENCES TO RELATED APPLICATION

This application is a Continuation-In-Part of Prior U.S. application Ser. No. 08/390,484, filed Feb. 17, 1995, now abandoned.

BACKGROUND OF THE INVENTION

The present invention appertains to automobiles, and specifically to a swivel model steering column, such that its pivotal column is perfunctorily controlled by a transmission, and is found in more recent models of automobiles ingeniously manufactured in this country.

Many prior art devices and methods exist to attempt to prevent the theft of automobiles. While these devices are all removed off the steering column before the vehicle can be driven, many criminals are able to by-pass such devices. For example, an impact device is capable of breaking the steering column in an area of a spring operated element, which permits starting the vehicle's engine. One such prior art device may be found in my prior U.S. Pat. No. 4,426,859.

SUMMARY OF THE INVENTION

Accordingly, one object of the present invention is to provide a plush auto column pivot lock. This invention is interchangeable from one vehicle to another, and conveniently locks auto pivotal columns while obstructing the drive gears.

Another object is to provide a deluxe motor vehicle security device that can removably occupy the steering column while the vehicle is being driven.

An additional object of the invention is to provide an auto anti-theft device that may be easily removed from the steering column, such as when an authorized person offers his vehicle for sell, since this device prevents rotation of pivotal columns even if a criminal starts the vehicle's engine.

A further object is to provide a vehicle pivot lock which will permit an authorized person to start the vehicle's engine, rotate the pivotable column, and operate the steering wheel while the device is secured about the steering column.

Hardness is defined as resistance to penetration so as to establish control. Of necessity the device may be made of metals which rank high in hardness so as to be machined to shape while soft, then harden by heat treatment to contribute strength and durability.

Now, there is provided a conventional cylinder lock for selectively controlling a pivot lock axis pin. Thus, the pivot lock axis pin is formed so that it is flexibly inserted into an axis pin enclosure, while the cylinder lock is pushed inwardly through the face portion about a lock-housing. When this device is removably installed about the steering column, authorized persons can drive the vehicle without removing it.

On the other hand, the lock-housing includes a pair of figurations beneath which will fit two laterally separated dovetail grooves upon two integral walls. This configuration secures the two integral walls upon the steering colum, while a releasably unmovable rod secures them beneath.

Preferably, the unmovable rod is inserted through a pair of threaded holes adjacently formed at the entrance of a hole assembly. The front portion about a threaded end of the unmovable rod is rotated within the pair of threaded holes at their rear portions, while the front end of the unmovable rod is obstructed by a wall at the end of the hole assembly.

A pivotal enclosure is formed by joining two divided walls having a cutout within one wall through which a mounted gear-shift lever projects. The other divided wall has a flat about which is rotated to a neutral position for easy removal of the cylinder lock. This position is also provided for the securement of the pivotal enclosure beneath about a fastening device, and in addition, provides for a joint united with the axis pin enclosure upon the pivotal enclosure as well.

Hence, the pivot lock axis pin is inserted into the axis pin enclosure at, or towards any positions between which the swivel model steering column may be swiveled. Further, a latch beneath the cylinder lock may be inserted into a pocket formed upon the two integral walls. These two integral walls are thus regarded as a housing while joined to one another.

Ergo, the auto pivot lock will prevent unauthorized persons from pivotally moving the pivotal column from "park," thus, while at the same time the swivel model steering column will conventionally continue to swivel without change.

BRIEF DESCRIPTION OF THE DRAWINGS

Further objects and advantages of the present invention will become apparent from a consideration of the drawings and description thereof.

DETAILED DESCRIPTION OF THE PREFERRED EMBODIMENTS

Figure 2:
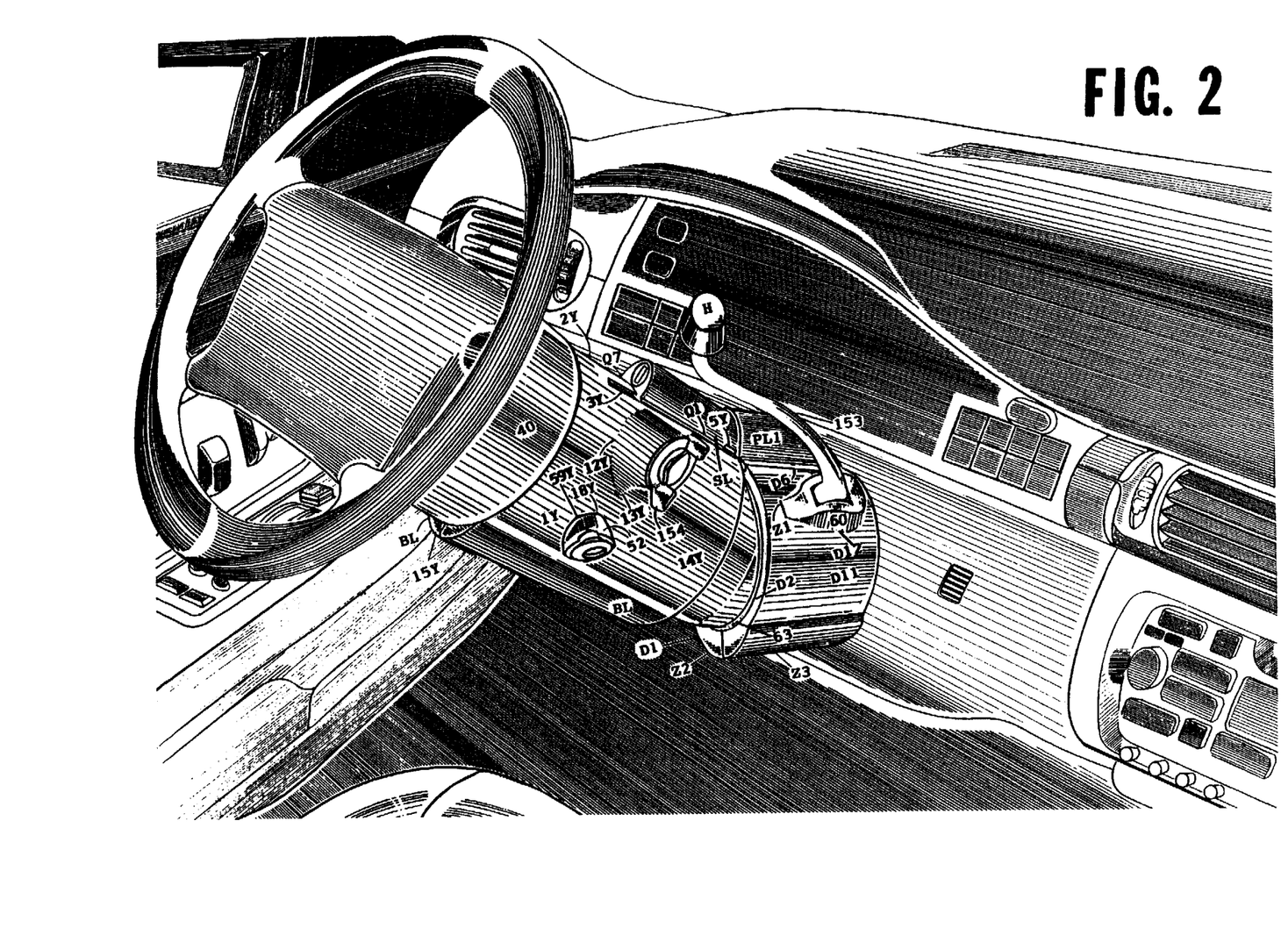
FIG. 2 is a perspective view of a swivel model security device locked about a swivel model steering column.
Figure 5:
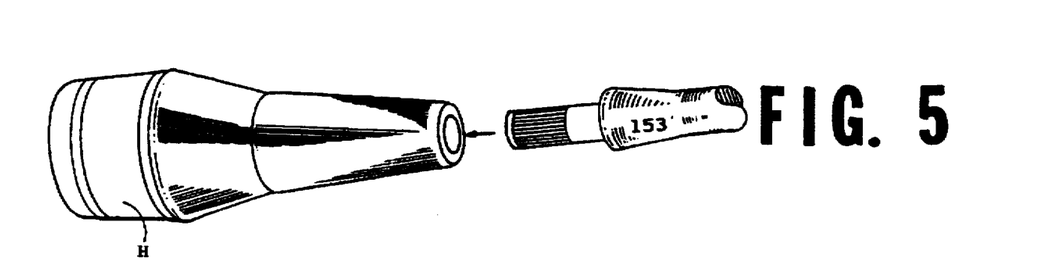
FIG. 5 is a view of a removable gear-shift handle.
Figure 7:
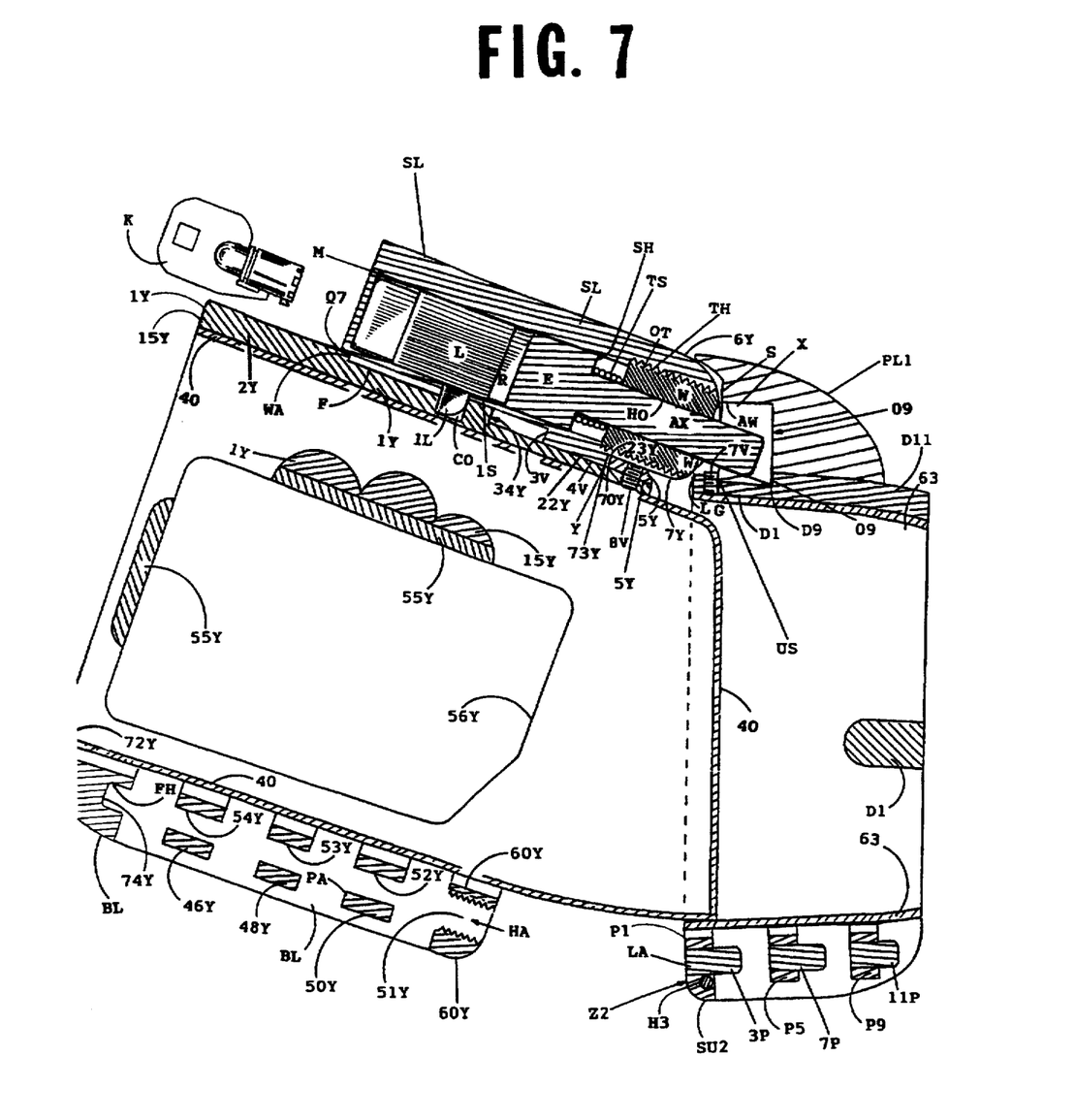
FIG. 7 is a side view of the swivel model security device having a pin being movable up and down in a passage.

Referring to FIG. 2, there is shown a conventional steering column 40, and an ignition lock 154 which is mounted to lock the steering column 40 about a tilted position, and a typical automobile application. The steering column 40 has a flasher 52, which is also typically shown extending laterally through a cutout 18Y. A pivotal column 63 has a mounted gear shift lever 153, and is pivotable in a plane perpendicular to the axis of the steering column 40, such as to pivot out of a "parking-gear" P (FIG. 3), and into any preferred gears. The conventional gear-shift lever 153 has a removable handle H at its above portion (FIG. 5). Moreover, the lever 153 controls a conventional indicator I (FIG. 3), as a conventional lock L controls a pivot lock axis pin AX (FIG. 7).

Figure 8:
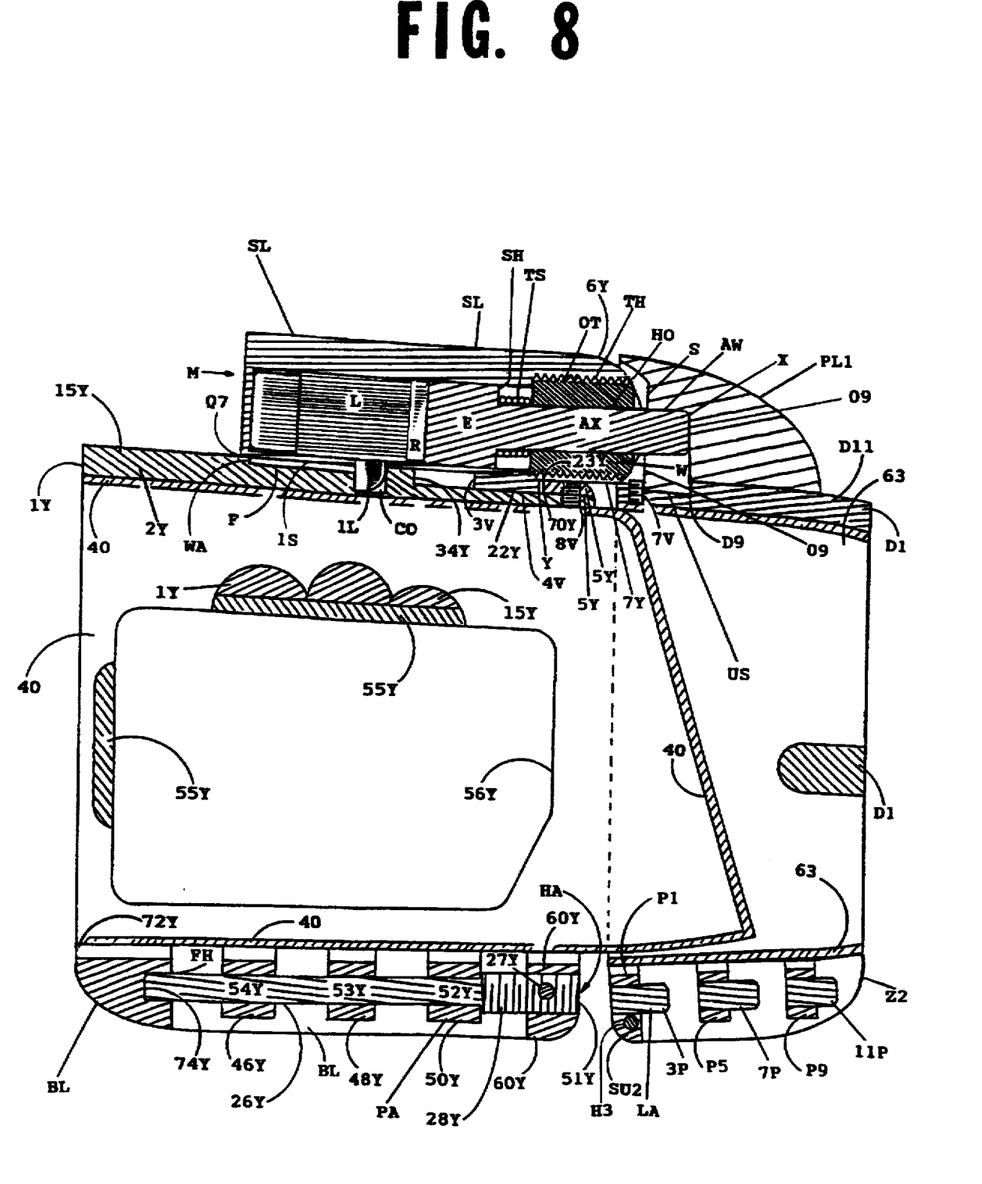
FIG. 8 is a side view of the swivel model device being locked about a typical automobile application.

The present invention being illustrated in FIG. 8, generally includes ten pieces: a housing 1Y, a lock-housing SL, an unmovable rod 26Y, a pin element E has the pivot lock axis pin AX, an axis pin enclosure PL1, a pivotal enclosure D11, one portion of music wire 57Y (FIG. 6), one portion of spring wire MW2 (FIG. 13), a fixture 5Y, and a rotatable wall W having an outer threaded surface OT.

Figure 12:
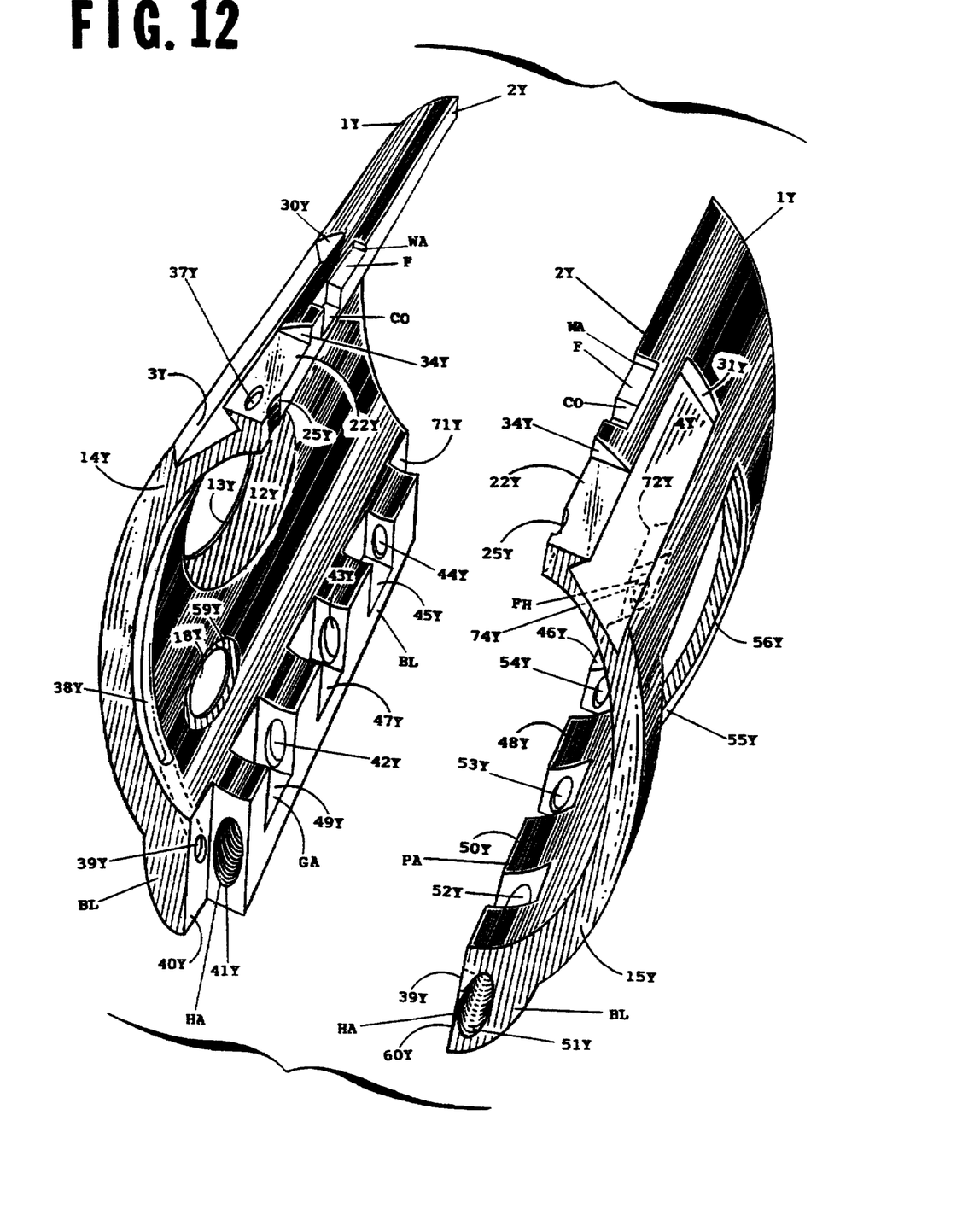
FIG. 12 is a perspective view of two divided walls.

Referring to FIG. 12, the housing 1Y having two divided integral walls 14Y and 15Y defined by two laterally separated dovetail grooves 3Y and 4Y. The housing 1Y having two divided flat surfaces 22Y adjacent two divided pocket portions C0 upon the two divided integral walls 14Y and 15Y. The housing 1Y is sized to fit over the swivel model steering column 40 (FIG. 2) having the mounted ignition lock 154.

Figure 3:
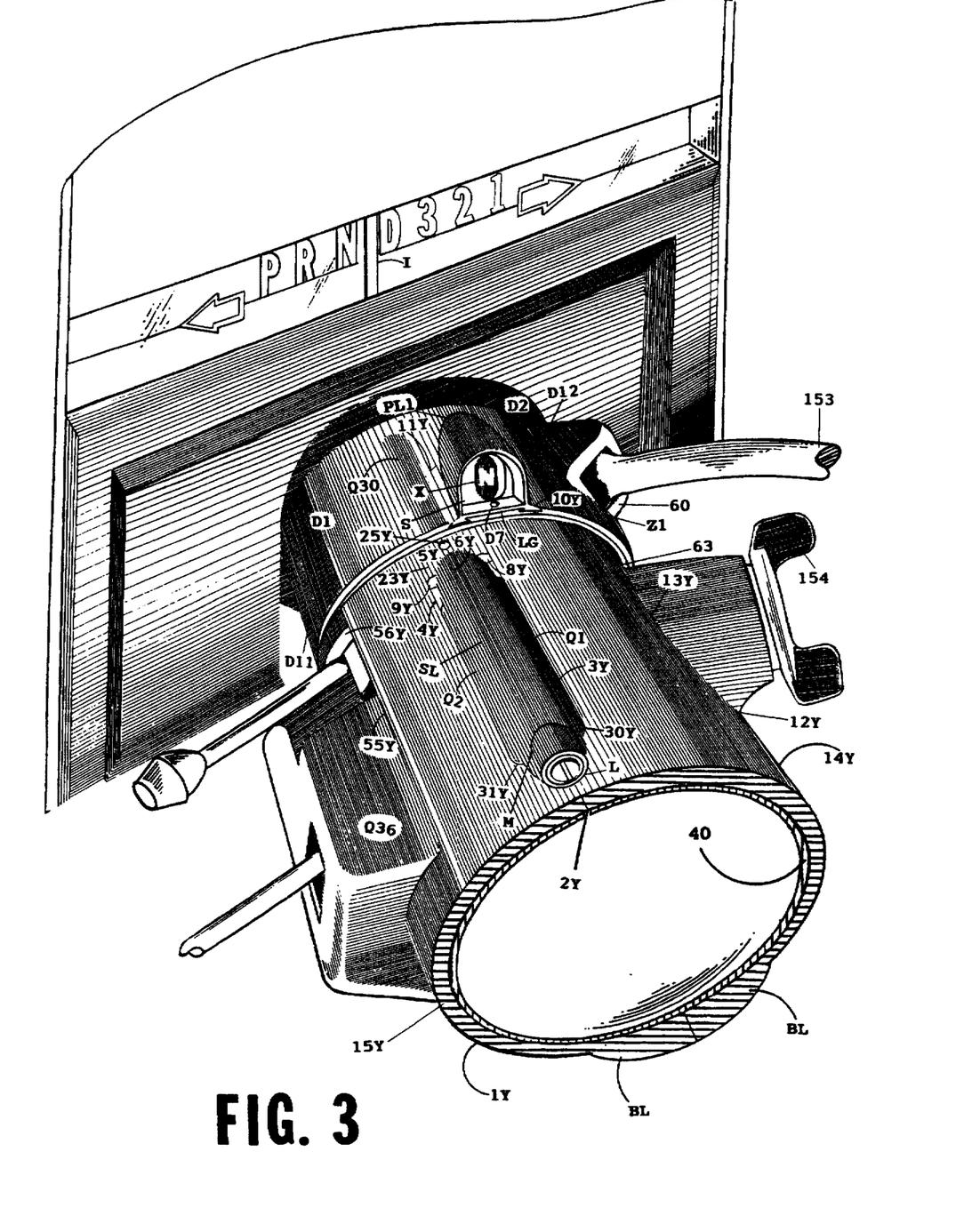
FIG. 3 is a perspective view of a device according to the present invention defined by an unlocked position.
Figure 6:
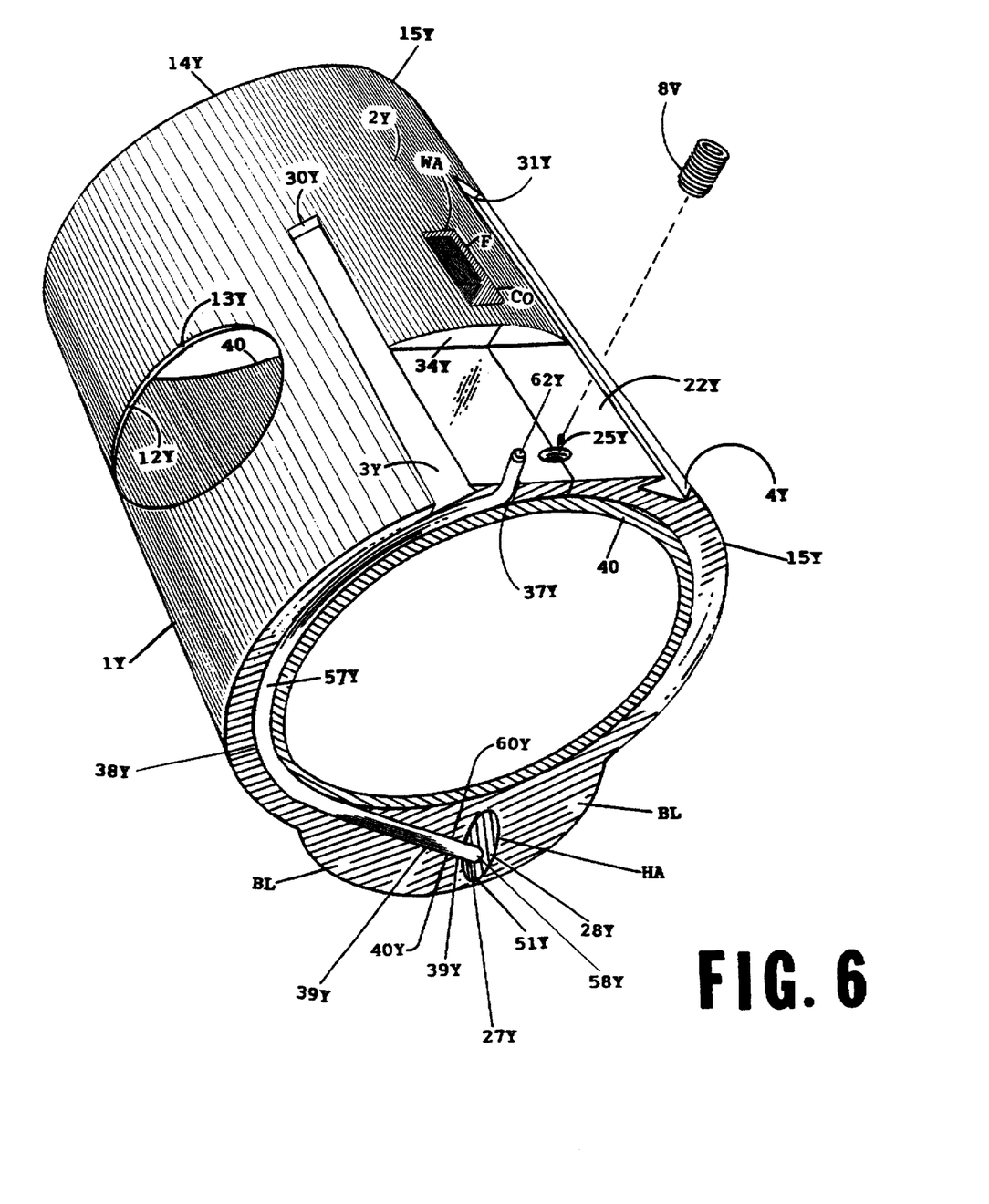
FIG. 6 is a perspective view of the steering column enclosure defined by a portion of music wire within its rut.
Figures 9, 10:
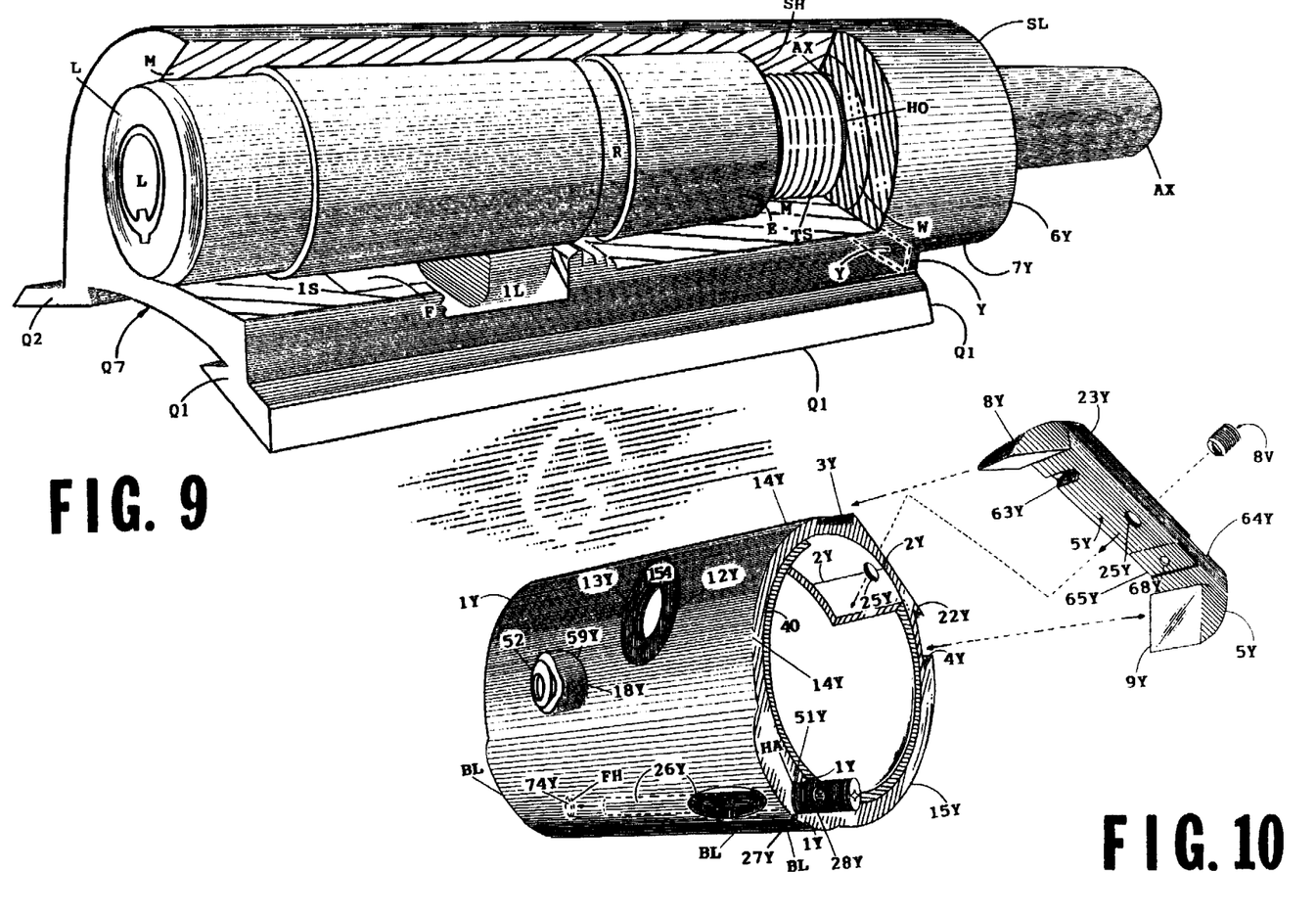
FIG. 9 shows the lock-housing having a conventional cylinder lock, and defined by a dovetail arrangement below.
FIG. 10 shows an exploded view of the assembly.

As shown in FIG. 9, the lock-housing SL and a pair of dovetail figurations Q1 and Q2 are provided for attaching the two divided integral walls 14Y, and 15Y upon the steering column 40 (FIG. 3). This will permit the two flat surfaces 22Y, and the two pocket portions C0 to mate (FIG. 6).

As shown in FIG. 10, a portion BL below the housing 1Y is provided for rotating the releasably unmovable rod 26Y about a lower hole assembly HA (FIGS. 8 and 11) through the housing 1Y. As shown in FIG. 7, the pin element E having the pivot lock axis pin AX to enter the axis pin enclosure PL1. However, the axis pin enclosure PL1 is to fit firmly upon the pivotal enclosure D11 (FIG. 4), which is sized to fit tightly on the pivotal column 63. Therefore, this arrangement is to forbid unlawful assess to the pivot mechanism.

Figure 11:
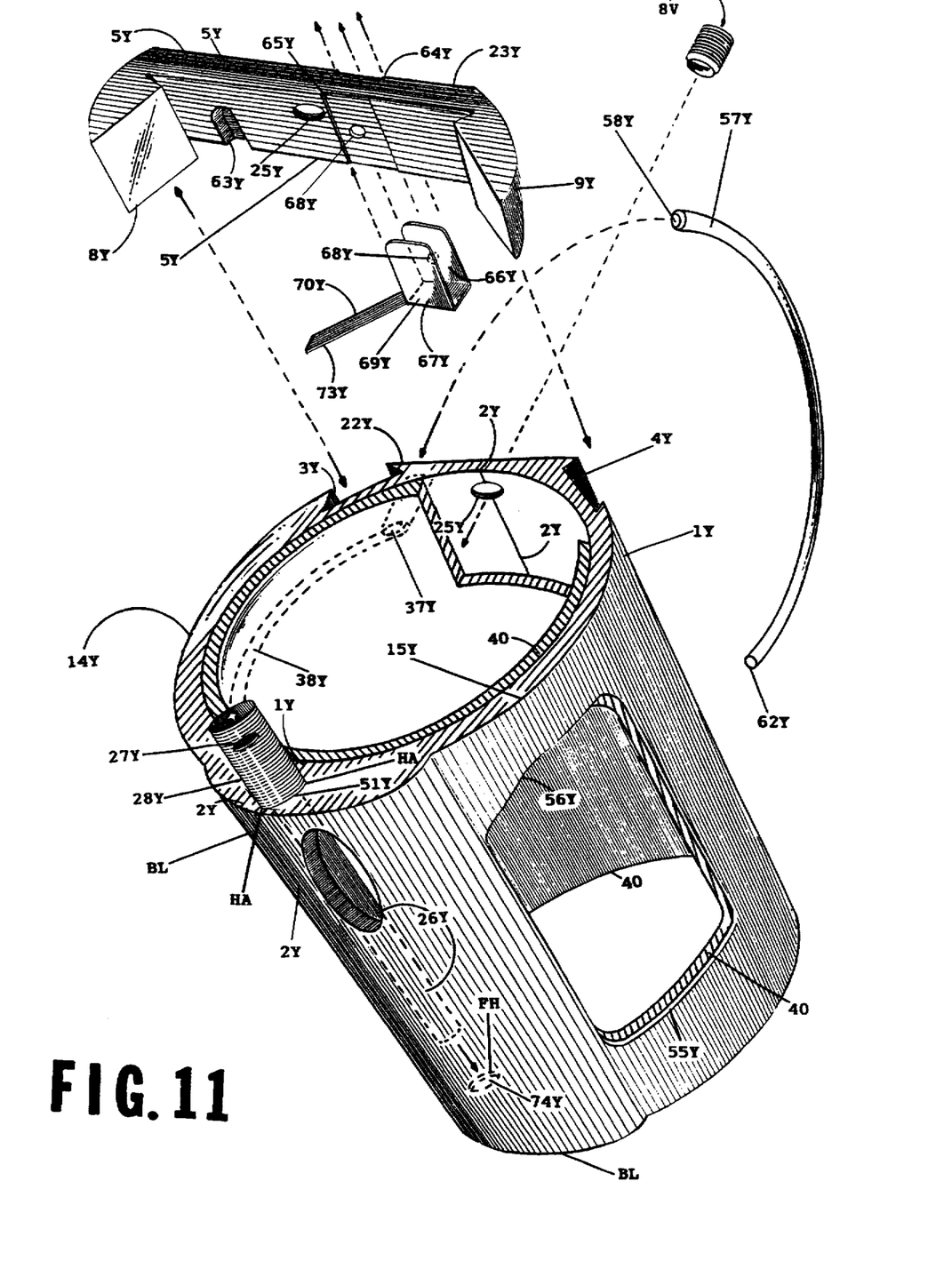
FIG. 11 shows an exploded view of the assembly.
Figure 15:
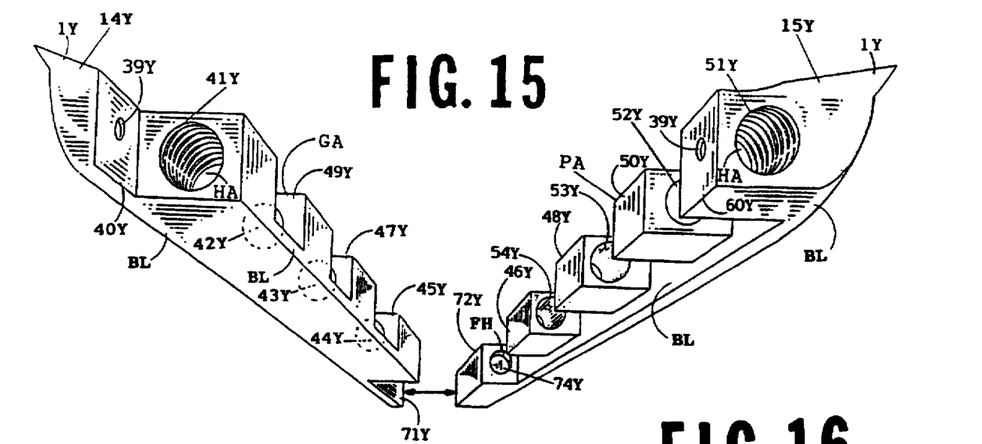
FIG. 15 shows an exploded view of the assembly.

Hence, the housing 1Y having a nether gap assembly GA sized to fit a compatibly extended part assembly PA (see FIG. 15). Notwithstanding, the housing 1Y includes a rut 38Y inwardly, and further includes the portion of music wire 57Y (FIG. 11). The music wire 57Y being sized to fit the rut 38Y inwardly, and about the steering column 40 (FIG. 6) and being sized to fit a hole 27Y (FIGS. 8 and 10) in a threaded end 28Y (FIG. 11) of the unmovable rod 26Y.

Figure 1:
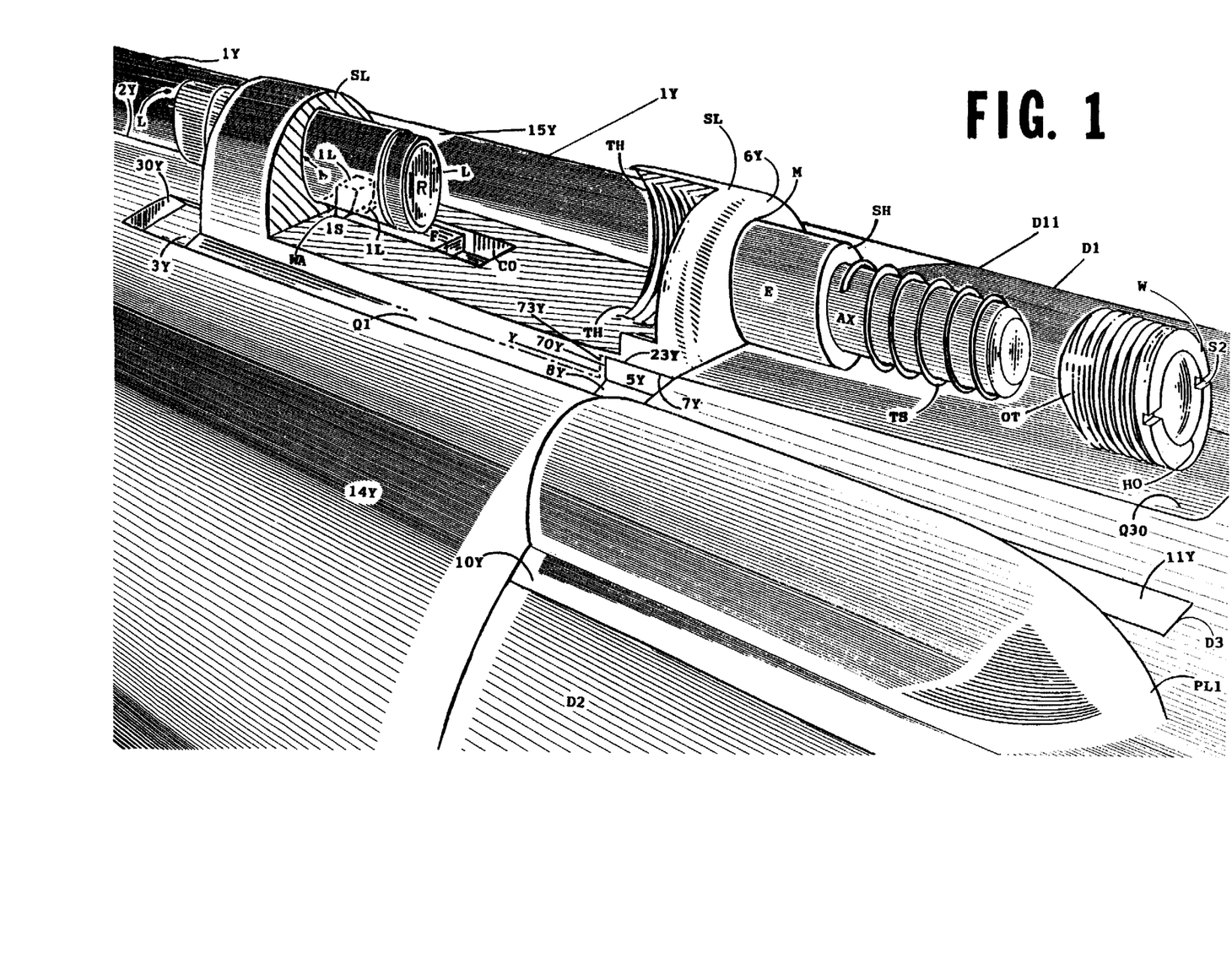
FIG. 1 shows an exploded view of the assembly, and a passage means for ejecting a lock from a lock-housing.

While at the same time, the housing 1Y includes two furrow portions F, such as to define one furrow F (FIG. 6) to fit a second furrow F beneath the lock-housing SL (FIG. 9) of a surface 1S, so as to define a binary system (see FIG. 1). This housing 1Y having a hole 39Y beneath the rut 38Y about a surface 40Y, while two walls 30Y and 31Y may stop the pair of dovetail figurations Q1 and Q2 (FIG. 9). Consequently, three cutouts 18Y, 56Y, and 12Y having three chamfers 59Y, 55Y, and 13Y being sized to fit the flasher 52 (FIG. 14), a signal box Q36 (FIG. 3), and the ignition lock 154. The housing 1Y also comprises two wall portions 34Y, and a mid way point 2Y to be straddled by a cutout Q7 (FIG. 9) beneath the lock-housing SL (i.e., to conform upon the outer housing 1Y shown in FIG. 2).

Referring to FIG. 7, the lock-housing SL comprises a front wall 3V beneath, to fit the wall portions 34Y (FIG. 6), and a lower surface 4V to rest upon the two flat surfaces 22Y (FIG. 12). Thus, a pocket-wall Y (FIGS. 1 and 9) is to fit a surface 73Y (FIG. 1) about a spring 70Y (FIG. 11). This lock housing SL firmly includes the pivot lock axis pin AX. A key K operated cylinder lock L being provided with a latch 1L at its lower portion to be blocked by a wall WA (FIG. 6). Ergo, the latch 1L is sized to fit a pocket C0 (FIGS. 1 and 6) upon the housing 1Y thus having the cylinder lock L, the latch 1L, the pivot lock axis pin AX, and a passage X of the axis pin enclosure PL1 to forbid unlawful access to the drive gears in FIG. 3 (D, 3, 2, and 1). The steering column 40 is provided with a conventional mechanism to be swiveled uninterruptedly (e.g., FIG. 8 being compared with FIG. 7 shows that the pivot lock axis pin AX is inserted into the axis pin enclosure PL1 at, or toward any positions between which the steering column 40 may be swiveled).

FIG. 11 shows the fixture 5Y defined by a slot 63Y to fit an extended end 62Y (FIG. 6) of the music wire 57Y. A setscrew 8V (FIGS. 6 and 10) is sized to fit a threaded hole 25Y while upon two threaded hole portions 25Y (FIG. 12). Two furrows 64Y and 65Y having a hole 68Y such as to fit a second hole 68Y of two walls 66Y and 67Y of a spring device 69Y. As the spring device 69Y is to be mounted about the two furrows 64Y and 65Y, where the arrows indicate, two shapes 8Y and 9Y are to fit the two separated dovetail grooves 3Y and 4Y. For example, FIG. 8 shows the fixture 5Y is mounted upon the flat surfaces 22Y by the setscrew 8V to block the lock-housing SL.

Referring to FIGS. 11 and 12, the extended end 62Y of the music wire 57Y is sized such as to fit a hole 37Y upon one divided flat surface 22Y (FIG. 6) of one divided integral wall 14Y. However, the extended end 62Y is sized to obstruct the fixture 5Y by an inner surface of the slot 63Y. Further, the threaded hole 25Y is to mate upon the two threaded hole portions 25Y, so that the rut 38Y is under the hole 37Y which is upon the one flat surface 22Y (i.e., to receive an end 58Y of the music wire 57Y where the arrow indicates).

The unmovable rod 26Y being formed at the threaded end 28Y to pivotally enter two threaded holes 41Y and 51Y at the entrance of the hole assembly HA. Thus, the hole 27Y in the threaded end 28Y will be laterally sized to fit a second hole 39Y about a surface 60Y, thereby being positioned within the hole assembly HA (see FIG. 8) to block the face end 58Y of the music wire 57Y (shown in FIG. 6 to prevent rotation).

Referring to FIGS. 12 and 15, the hole assembly HA is defined by the two threaded holes 41Y and 51Y, beneath the two integral walls 14Y and 15Y. The hole assembly HA is also adjacently sized to fit a third hole 52Y, so as to be in an alignment with six additional holes: 42Y, 53Y, 43Y, 54Y, 44Y and FH. A wall 74Y in the final hole FH is being interiorly sized so as to obstruct the face end of the unmovable rod 26Y (FIG. 11). Thus, the wall 74Y being defined by a surface 72Y laterally sized to fit an adjacent surface 71Y.

The gap assembly GA having three gaps: 49Y, 47Y, and 45Y, being sized to outfit three extended parts of the part assembly PA, namely, 50Y, 48Y, and 46Y. As a rule, the hole 39Y beneath the rut 38Y is to mate with the second hole 39Y.

Referring to FIG. 1, the pivot lock axis pin AX thus having a tension spring TS to fit a shoulder SH about the pin element E. Ergo, the pin element E is sized to fit a passage means M through the lock-housing SL, so as to engage with the cylinder lock L at its rearward portion R. The pin element E being sized at the pivot lock axis pin portion AX, such as to fit a hole H0 through the threaded wall W which includes rear slots S2. The outer threaded surface OT is to befit an inner threaded surface TH within the lock-housing SL. However, the pivot lock axis pin AX being sized to enter the passage means X (FIGS. 3 and 4) within the axis pin enclosure PL1, so as to be blocked interiorly by a wall O9 (FIG. 4) which is sized to reversibly fit two rail portions D9

Figures 13, 14:
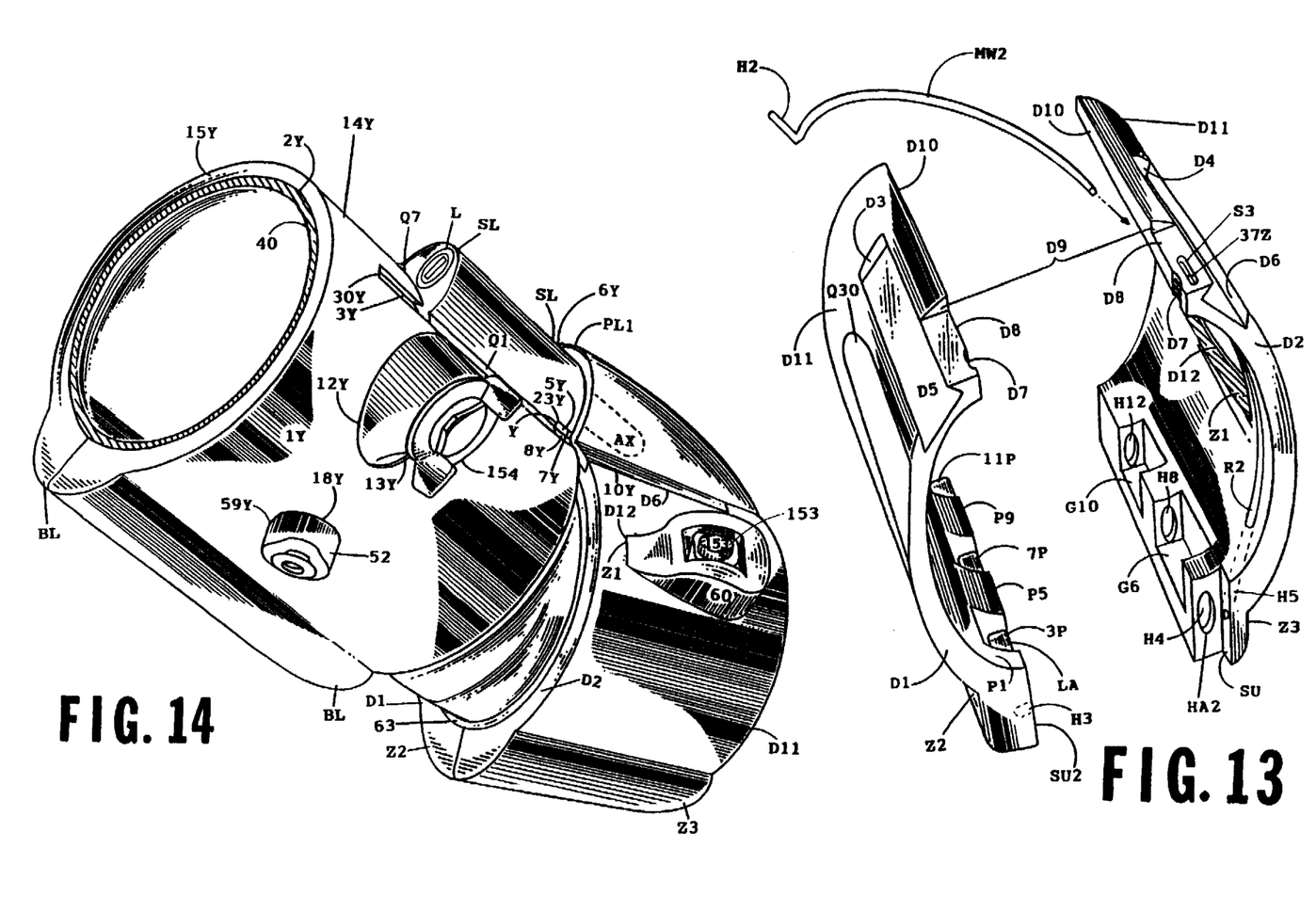
FIG. 13 is a perspective view of two pivotal walls.
FIG. 14 is a perspective view of the invention.

(FIG. 13). Consequently, FIG. 4 shows (e.g., a rear portion about a ledge LG is being defined by the wall O9, such that its above surface is in the midst of the passage X, as the left and right lower sides are to be blocked by the rail portions D9).

Figure 4:
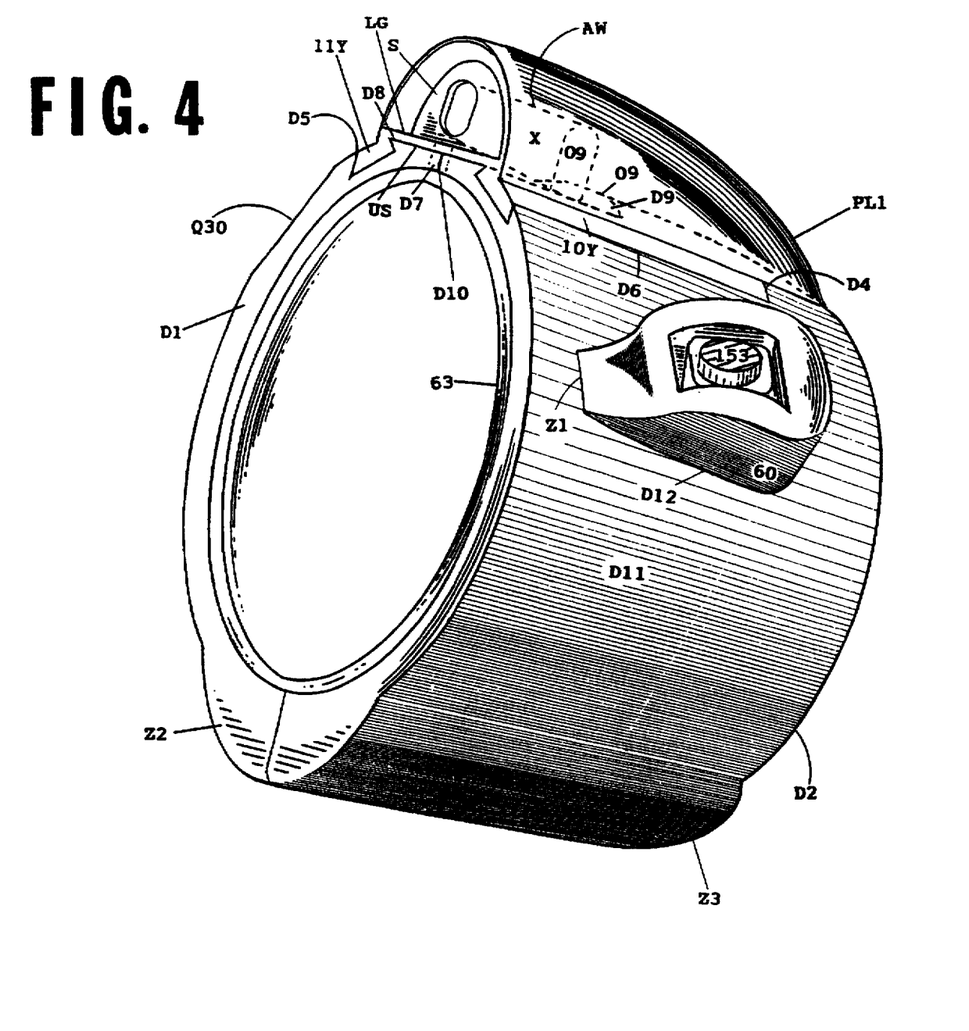
FIG. 4 is a perspective view of a pivotal enclosure having an axis pin enclosure releasably joined thereupon.

Referring to FIGS. 3 and 4, the axis pin enclosure PL1 comprises the ledge LG having a threaded hole D7 upon two threaded hole portions D7 (FIG. 13). This axis pin enclosure PL1 has a flat undersurface US to rest upon two flat surfaces D8 (FIG. 13) about two pivotal walls D1 and D2. The axis pin enclosure PL1 has a, concavely curved front structure S being sized to fit a rearward surface 6Y about the lock-housing SL (FIG. 9). E.g., FIG. 7 shows the free turning of the surface 6Y in a horizontal plane. An undersurface 7Y about the lock housing SL is sized to rest upon a top surface 23Y (FIGS. 1 and 11) of the fixture 5Y (on the setscrew 8V). As the lock housing SL is conventionally provided with a mechanism to be swiveled, or defined by a typical automobile form, a wall AW (FIG. 8) is provided to block the top of the pivot lock axis pin AX (e.g., the column 40 can not descend from this area).

The auto column pivot lock 1Y is so provided with a mechanism, as for pivoting the pivotal column 63 is normally operable with the auto column pivot lock 1Y installed on the steering column 40. The durable steel auto column pivot lock 1Y is resistant to penetration such as to forbid unauthorized access to a vehicle's transmission gear means.

Referring to FIGS. 13 and 14, the pivotal enclosure D11 includes the two pivotal walls D1 and D2 defined by two separated dovetail suits D5 and D6. The two rail portions D9 are to interiorly block the axis pin enclosure PL1 (FIG. 4), as the portion of spring wire MW2 is formed to fit a hole 37Z within a slot S3. A handle H2 of the spring wire MW2 is to fit the slot S3 about a flat D8 upon the outer pivotal wall D2. The pivotal enclosure D11 also includes two portions Z2 and Z3 below, and having a cutout and a chamfer Z1 and D12 to fit a gear shift base 60 mounted about the pivotal column 63.

Referring to FIG. 4, a pair of figurations 10Y and 11Y formed below the axis pin enclosure PL1 to fit the two separated dovetail suits D5 and D6, and being provided for tightly attaching the pivotal walls D1 and D2 on the pivotal column 63. This allows the rail portions D9 and the portions Z2 and Z3 below the pivotal enclosure D11 to mate. E.g., in FIG. 13 the part Z2 is pushed reversibly against the part Z3 to fit a pin latch assembly LA in a second hole assembly HA2.

Referring to FIGS. 13 and 14, the pivotal enclosure D11 is provided for unloading the cylinder lock L through the lock-housing SL of a flat Q30 (FIGS. 1 and 4) on the pivotal wall D1, whereas the pivotal column 63 is in a neutral gear N (see FIG. 3). For example, this neutral gear N position in FIG. 3 may adequately provide the clearance for an insertion, and/or ejection of the axis pin enclosure PL1 as well.

A midway point D10 upon the pivotal enclosure D11 is to be straddled by the axis pin enclosure PL1 (FIG. 4), as the pin latch assembly LA formed beneath the inwardly pivotal wall D1 includes three pins: 3P, 7P, and 11P. The three pins 3P, 7P, and 11P are fixed in three projections P1, P5, and P9 to fit three holes H4, H8 and H12 of the second hole assembly HA2. Two gaps G6 and G10 adjacent to a surface SU that has a hole H5 below a second rut R2 to fit a second hole H3 within a second surface SU2. The second surface SU2 is characterize by one of the three projections, namely, P1, while the spring wire MW2 is sized to fit the second rut R2.

Thus, the spring wire MW2 being sized to fit about the pivotal column 63 to fit the hole H5 beneath the second rut R2, and to be blocked by the second hole H3. Hence, the two figurations 10Y and 11Y (FIGS. 1, 3 and 4) being formed beneath the axis pin enclosure PL1, such as to be blocked by two wall parts D3 and D4 about the end portions of the two dovetail suits D5 and D6.

Besides, the pivotal enclosure D11 further includes a setscrew 7V (FIGS. 7 and 8) to fit the threaded hole D7 of the ledge LG (FIGS. 3 and 4), such as to mount the ledge LG upon the threaded hole portions D7. As a result, the pivotal enclosure D11 is firmly secured about the pivotal column 63 to forbid (and/or prevent) unlawful access thereto (FIG. 2).

Figure 16:
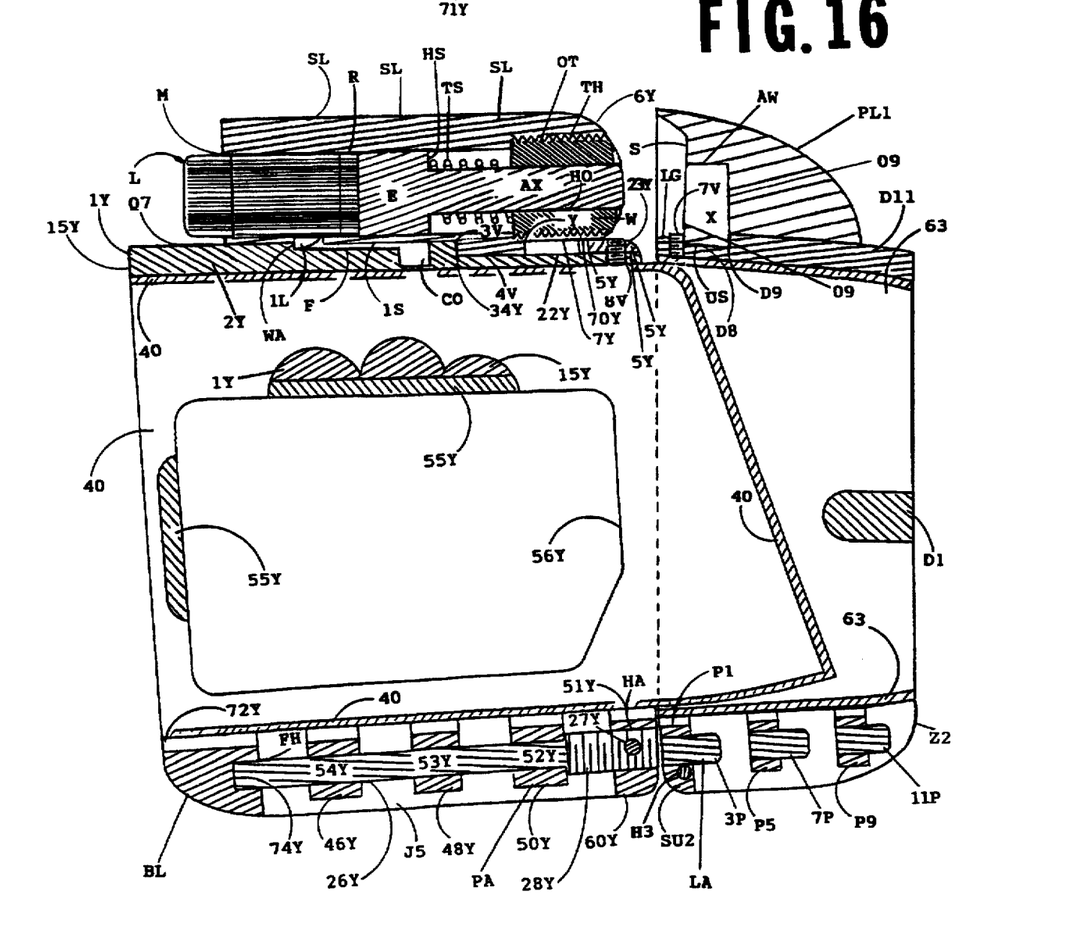
FIG. 16 is a side view of the swivel model device being unlocked and swiveled downwardly to its least position.

To use the auto column pivot lock 1Y, an authorized person must install the housing 1Y on the steering column 40, when it is swiveled to its typical auto column form (FIG. 3). The lock-housing SL is inserted within the grooves 3Y and 4Y, then, the unmovable rod 26Y is rotated into the hole assembly HA (FIG. 8). The music wire 57Y is moved around the steering column 40 (FIG. 6), as the fixture 5Y is mounted upon the two surfaces 22Y (FIG. 7). In FIG. 3, the pivotal column 63 must be rotated to the neutral position N which is designated by a reference letter I. The enclosure D11 is installed about the pivotal column 63, as the axis pin enclosure PL1 is installed on the enclosure D11. The column 63 is pivoted to the "park" position P, while the pivot lock axis pin AX is inserted into the axis pin enclosure PL1, when the lock L is pushed through the face portion about the lock-housing SL. Hence, the latch 1L is simultaneously inserted into the pocket C0 (FIG. 7), as the pivotal column 63 is, indeed, adamantly locked in "park." FIG. 16 shows that authorized access to a pivotal mechanism of the column 63 is achieved; however, by inserting the key K and turning it to the unlocked position. The latch 1L may be released from the pocket C0, indeed, causing the lock L to be sent on a short course of travel in a brief space of time, as the spring TS expands with respect to the scope thereof.

As the above description contains many specifics, these should not be construed as limitations on the scope of the invention. Many other variations and modifications will be apparent to persons skilled in the art. For example, the fixture 5Y and the axis pin enclosure PL1 may be snapped into place about a push mechanism to omit the setscrews 7V and 8V.

I claim:

1. An auto column pivot lock therefore preventing unauthorized access to a swivel model auto pivotal column, or a typical auto pivotal column and adjacent gears, comprising:

a housing (1Y) embodying two divided integral walls (14Y and 15Y), and characterized by two laterally separated dovetail grooves (3Y and 4Y), such said housing (1Y) so defines two divided flat surfaces (22Y), and adjacent two divided pocket portions (C0) on said divided integral walls (14Y and 15Y) to fit on a steering column (40), which comprises a mounted ignition lock (154);

a lock-housing (SL), including a pair of dovetail figurations (Q1 and Q2);

means for attaching said two divided integral walls (14Y and 15Y) upon said steering column (40) such as to allow said two flat surfaces (22Y) and said pocket portions (C0) to mate;

means for rotating a releasably unmovable rod (26Y) into a lower hole assembly (HA) in said housing (1Y); and a pin element (E) having a pivot lock axis pin (AX) to enter an axis pin enclosure (PL1) as said axis pin enclosure (PL1) is to fit firmly on a pivotal enclosure (D11), which is so sized to fit tightly upon a pivotal column (63) and to forbid unlawful access to gears of said pivotal column (63), wherein said housing (1Y) has a gap assembly (GA) sized to fit a close extended part assembly (PA), wherein said housing (1Y) having a rut (38Y), and wherein said housing (1Y) having a composition of music wire (57Y) so sized to befit said rut (38Y) interiorly, whereby being so outwardly about said steering column (40) so as to fit a hole (27Y) in a threaded end (28Y) of said unmovable rod (26Y).

2. A lock as defined in claim 1, wherein said housing (1Y) includes two furrow portions (F) to define one furrow (F) to befit a second furrow (F) beneath said lock-housing (SL) of a surface (1S), such as to define a binary system, a hole (39Y) formed below said rut (38Y) about a surface (40Y), two walls (30Y and 31Y), so as to block said pair of dovetail figurations (Q1 and Q2), while three cutouts (18Y, 56Y, and 12Y) having three chamfers (59Y, 55Y, and 13Y) being sized to fit a flasher (52), a signal device (Q36), and said ignition lock (154), whereby including two wall portions (34Y), and a mid-way point (2Y) to be straddled by means of a cutout (Q7) beneath said lock-housing (SL).

3. A lock as defined in claim 2, wherein said lock-housing (SL) comprises a front wall (3V) beneath to fit said wall portions (34Y), a lower surface (4V) to recline on said two flat surfaces (22Y), a pocket-wall (Y) sized to fit a surface (73Y) about a spring (70Y), also a key (K) operated cylinder lock (L) being provided with a latch (1L) about its undersurface to be obstructed by a wall (WA), said latch (1L) is to fit a pocket (C0) on said housing (1Y), whereby causing said cylinder lock (L) to provide support about said pivot lock axis pin (AX) to block its ejection from a passage means (X) of said enclosure (PL1) to prevent unlawful access to a gear system, while said steering column (40) has means to be swiveled uninterruptedly.

4. A lock as defined in claim 1, wherein a fixture (5Y) has a slot (63Y) sized to fit an extended end (62Y) of said music wire (57Y), while a setscrew (8V) is to befit a threaded hole (25Y) including two threaded hole portions (25Y), two furrows (64Y and 65Y) defines a hole (68Y), a second hole (68Y) about two walls (66Y, and 67Y) of a spring device (69Y), whereby said spring device (69Y) is to be mounted within said two furrows (64Y and 65Y), as two shapes (8Y and 9Y) are sized to fit said two separated dovetail grooves (3Y and 4Y).

5. A lock as defined in claim 4, wherein a face end (58Y) defines said music wire (57Y), so that it is to suit a hole (37Y) upon one divided flat surface (22Y) of one divided integral wall (14Y), so that said extended end (62Y) is sized to obstruct said fixture (5Y) by an inward surface of said slot (63Y), so that said rut (38Y) is beneath said hole (37Y), which is upon one said divided flat surface (22Y).

6. A lock as defined in claim 5, wherein said unmovable rod (26Y) is sized at said threaded end (28Y), such as to enter two threaded holes (41Y and 51Y) about an entrance of said hole assembly (HA) as said hole (27Y) in said threaded end (28Y) will be laterally sized to block said face end (58Y) of said music wire (57Y).

7. A lock as defined in claim 6, wherein said two threaded holes (41Y and 51Y) being formed below in said two integral walls (14Y and 15Y), an adjacent third hole (52Y), so as to be in an alignment with six additional holes: (42Y, 53Y, 43Y, 54Y, 44Y), and one final hole (FH), so that a wall (74Y) in said final hole (FH) is being sized to stop a face end of said unmovable rod (26Y), there being defined by a surface (72Y) laterally sized to fit an adjacent surface (71Y).

8. A lock as defined in claim 2, wherein said gap assembly (GA) includes three gaps (49Y, 47Y, and 45Y), which are sized to outfit three extended parts of said part assembly (PA), as said hole (39Y), below said rut (38Y) is to mate with a second hole (39Y).

9. A lock as defined in claim 3, wherein said pivot lock axis pin (AX) includes one tension spring (TS) to fit a shoulder (SH) of said pin element (E), as said pin element (E) is sized to befit a passage means (M) through said lock-housing (SL), and to make contact with said cylinder lock (L) at its rearward portion (R) and being sized at said pivot lock axis pin (AX), so as to fit a hole (H0) through a threaded wall (W) behind which includes slots (S2), an outer threaded surface (OT) to fit an inner threaded surface (TH), thereinto said lock-housing (SL), said pin portion being so sized to enter said passage means (X) within said axis pin enclosure (PL1), so as to be blocked interiorly by a wall (O9) being sized to reversibly fit two rail portions (D9).

10. A lock as defined in claim 4, wherein said axis pin enclosure (PL1) defines a ledge (LG) that has a threaded hole (D7) upon two threaded hole portions (D7), and having a flat undersurface (US) to rest on two flat surfaces (D8) of two pivotal walls (D1 and D2), whereby having a concavely front structure (S) being sized to befit a rearward surface (6Y) about said lock-housing (SL), such that an undersurface (7Y) about said lock-housing (SL) is sized to repose upon a top surface (23Y) of said fixture (5Y).

11. A lock as defined in claim 1, wherein hand-held means for so rotating said pivotal column (63) is, normally operable with an auto column pivot lock (1Y) removably installed about said steering column (40).

12. An auto column pivot lock therefore preventing unauthorized access to a swivel model auto pivotal column, or a typical auto pivotal column and adjacent gears, comprising:

a pivotal enclosure (D11) including pivotal walls (D1 and D2) including two dovetail suits (D5 and D6), an axis pin enclosure, two rail portions to obstruct said axis pin enclosure (PL1), a portion of spring wire (MW2) is formed to, compatibly fit a hole (37Z) within a slot (S3), a handle (H2) of said spring wire (MW2) being so sized to fit said slot (S3) within a flat (D8) upon one said pivotal wall (D2), as two portions (Z2 and Z3) are beneath said pivotal enclosure (D11), whereby having a cutout (Z1) and a chamfer (D12) so sized to fit a gear shift base (60) of said pivotal column (63);

a pair of figurations (10Y and 11Y) are constructed below said axis pin enclosure (PL1) to befit said two dovetail suits (D5) and (D6);

means for tightly attaching said pivotal walls (D1) and (D2) on said pivotal column (63) to so permit said rail portions (D9) and said two portions (Z2 and Z3) formed below said pivotal enclosure (D11) to mate; a cylinder lock and a lock-housing;

means for removing said cylinder lock (L) by way of said lock-housing (SL) about a flat (Q30) on a pivotal wall (D1), as said pivotal column (63) is in a neutral gear (N); and a mid-way point (D10) being defined on said pivotal enclosure (D11) and may be straddled by said axis pin enclosure (PL1), a pin latch assembly (LA) may be fixed in a pivotal wall (D1), and having pins (3P, 7P, and 11P) permanently in projections (P1, P5, and P9) to befit holes (H4, H8, and H12) in a hole assembly (HA2), two gaps (G6 and G10) adjacent to a surface (SU) including a hole (H5) beneath a rut (R2), said hole being sized to correspond to a second hole (H3) within a second surface (SU2) of one of three said projections (P1), such that said spring wire (MW2) is harmoniously sized exteriorly to fit said rut (R2), wherein said spring wire (MW2) being sized to fit about said pivotal column (63) to befit said hole (H5) below said rut (R2) to be obstructed interiorly by a surface of said second hole (H3), wherein said figurations (10Y and 11Y) are, below said axis pin enclosure (PL1) constructively such as to be blocked by two wall parts (D3 and D4) of said dovetail suits (D5 and D6) from passage, and wherein said pivotal enclosure (D11) additionally has a setscrew (7V), such as to fit a threaded hole (D7) of a ledge (LG), so as to mount said ledge (LG) upon threaded hole portions (D7) of said enclosure, whereby being strongly secured about said pivotal column (63) to prevent unlawful access thereto.

* * * * *